(12) United States Patent
Saito et al.

(10) Patent No.: US 7,847,857 B2
(45) Date of Patent: Dec. 7, 2010

(54) IMAGING DEVICE AND EXPOSURE CONTROL METHOD FOR IMAGING DEVICE

(75) Inventors: Shinichiro Saito, Kanagawa (JP); Masaaki Sato, Kanagawa (JP); Hirotake Cho, Kanagawa (JP)

(73) Assignee: Sony Corporation, Tokyo (JP)

( * ) Notice: Subject to any disclaimer, the term of this patent is extended or adjusted under 35 U.S.C. 154(b) by 735 days.

(21) Appl. No.: 11/735,775

(22) Filed: Apr. 16, 2007

(65) Prior Publication Data
US 2008/0165264 A1 Jul. 10, 2008

(30) Foreign Application Priority Data
Apr. 17, 2006 (JP) ............... P2006-113272

(51) Int. Cl.
*H04N 5/238* (2006.01)
(52) U.S. Cl. ............... 348/364; 348/229.1; 348/273; 348/276; 348/296; 348/297
(58) Field of Classification Search ............ 348/221.1, 348/223.1, 229.1, 254, 255, 273, 276, 279, 348/296, 297, 362, 363, 364, 367
See application file for complete search history.

(56) References Cited

U.S. PATENT DOCUMENTS

| | | | | |
|---|---|---|---|---|
| 5,621,462 | A * | 4/1997 | Takahashi et al. | 348/363 |
| 6,630,960 | B2 * | 10/2003 | Takahashi et al. | 348/364 |
| 6,714,243 | B1 * | 3/2004 | Mathur et al. | 348/273 |
| 6,831,692 | B1 * | 12/2004 | Oda | 348/315 |
| 7,573,507 | B2 * | 8/2009 | Une | 348/223.1 |
| 2002/0044209 | A1 * | 4/2002 | Saito | 348/280 |
| 2002/0140824 | A1 * | 10/2002 | Christoff et al. | 348/216.1 |
| 2003/0011693 | A1 * | 1/2003 | Oda | 348/272 |
| 2003/0184659 | A1 * | 10/2003 | Skow | 348/223.1 |
| 2004/0135899 | A1 * | 7/2004 | Suemoto | 348/223.1 |
| 2006/0055795 | A1 * | 3/2006 | Nakai et al. | 348/229.1 |
| 2007/0076113 | A1 * | 4/2007 | Tamaru et al. | 348/333.01 |

(Continued)

FOREIGN PATENT DOCUMENTS

JP 2000-156823 6/2000

(Continued)

OTHER PUBLICATIONS

Japanese Office Action dated May 20, 2008 for Application No. 2006-113272.

*Primary Examiner*—Lin Ye
*Assistant Examiner*—Chriss S Yoder, III
(74) *Attorney, Agent, or Firm*—SNR Denton US LLP

(57) ABSTRACT

An imaging device includes a sensor that is color coded by using high-sensitivity pixels having higher sensitivity to incident light than chromatic color pixels and an automatic exposure function that allows the imaging device to control exposure according to illuminance in an imaging environment. An algorithm in the automatic exposure function that determines a reference color in a level diagram according to the illuminance uses the high-sensitivity pixels as the reference color in a low illuminance region where the gain of the sensor is set to a maximum, while using green pixels, which are the chromatic color pixels, as the reference color in a standard illuminance region where the gain of the sensor is set to a minimum.

10 Claims, 8 Drawing Sheets

U.S. PATENT DOCUMENTS

2007/0076269 A1* 4/2007 Kido et al. .................. 358/474
2008/0128598 A1* 6/2008 Kanai et al. ................. 250/226

FOREIGN PATENT DOCUMENTS

| JP | 2000-316163 | 11/2000 |
| JP | 2007-288403 | 11/2001 |
| JP | 2003-032694 | 1/2003 |
| JP | 2003-153291 | 5/2003 |
| JP | 2003-199117 | 7/2003 |
| JP | 2007-208885 | 8/2007 |
| JP | 2007-274632 | 10/2007 |
| WO | 02/056603 | 7/2002 |
| WO | 2006/064564 | 6/2006 |

* cited by examiner

US 7,847,857 B2

IMAGING DEVICE AND EXPOSURE CONTROL METHOD FOR IMAGING DEVICE

CROSS REFERENCES TO RELATED APPLICATIONS

The present invention contains subject matter related to Japanese Patent Application JP 2006-113272 filed in the Japanese Patent Office on Apr. 17, 2006, the entire contents of which being incorporated herein by reference.

BACKGROUND OF THE INVENTION

1. Field of the Invention

The present invention relates to an imaging device whose gain is set to achieve high S/N and an exposure control method for the imaging device.

2. Description of the Related Art

There has been proposed an image sensor that uses white (gray) pixels for coding. White balance in signal processing in an image sensor is typically carried out with reference to green pixels. However, color coding including white (gray) pixels causes the following various problems because the white (gray) pixels will be saturated earlier than other color filters. One of the problems is reduced linearity after signal processing. When correlation of white pixel signals is used to generate a chrominance signal and a luminance signal, the chrominance signal and the luminance signal fail in the saturated region. Another problem is that although white pixels contribute as a luminance signal component, saturation of white pixels earlier than other color pixels causes reduced resolution and a lower dynamic range. Color coding including white (gray) pixels for improving the sensitivity of an image sensor has been proposed (see Re-publication of PCT patent application WO2002/056603, for example).

SUMMARY OF THE INVENTION

Problems to be solved are reduced resolution and a lower dynamic range caused by saturation of white pixels earlier than other color pixels.

It is desirable to determine the reference color in a level diagram in an adaptive manner so as to improve the resolution and dynamic (D) range in a standard illuminance region and improve the sensitivity in a low illuminance region.

According to an embodiment of the invention, there is provided an imaging device including a sensor that is coded by using high-sensitivity pixels having higher sensitivity to incident light than chromatic color pixels, and an automatic exposure function that allows the imaging device to control exposure according to illuminance in an imaging environment. An algorithm in the automatic exposure function that determines a reference color in a level diagram according to the illuminance uses the high-sensitivity pixels as the reference color in a low illuminance region where the gain of the sensor is set to a maximum, while using green pixels, which are the chromatic color pixels, as the reference color in a standard illuminance region where the gain of the sensor is set to a minimum.

In the imaging device according to this embodiment of the invention, use of the high-sensitivity pixels having higher sensitivity than the chromatic color pixels provides a high-sensitivity imaging device. Particularly, use of the high-sensitivity pixels having high sensitivity as the reference color in the low illuminance region allows high sensitivity. Use of the green pixels as the reference color in the standard illuminance region allows high resolution and a wide dynamic range in the standard illuminance region.

According to another embodiment of the invention, there is provided an exposure controlling method for an imaging device including a sensor that is color coded by using high-sensitivity pixels having higher sensitivity to incident light than chromatic color pixels, and an automatic exposure function that allows the imaging device to control exposure according to illuminance in an imaging environment. An algorithm in the automatic exposure function that determines a reference color in a level diagram according to the illuminance uses the high-sensitivity pixels as the reference color in a low illuminance region where the gain of the sensor is set to maximum, while using green pixels, which are the chromatic color pixels, as the reference color in a standard illuminance region where the gain of the sensor is set to minimum.

In the exposure controlling method for an imaging device according to this embodiment of the invention, use of the high-sensitivity pixels having higher sensitivity than the chromatic color pixels provides high sensitivity. Particularly, use of the high-sensitivity pixels having high sensitivity as the reference color in the low illuminance region enhances the sensitivity in the low illuminance region. Use of the green pixels as the reference color in the standard illuminance region enhances the resolution and increases the dynamic range in the standard illuminance region.

In the imaging device according to the above embodiment of the invention, it is possible to increase the sensitivity, particularly the sensitivity in the low illuminance region, so that even in a dark imaging environment or in an imaging environment having a dark portion, images can be obtained in a high sensitivity condition. In the standard illuminance region, the resolution can be enhanced and the dynamic range can be increased, so that sharp images can be obtained.

In the exposure controlling method for an imaging device according to the embodiments of the invention, it is possible to increase the sensitivity of the imaging device, particularly the sensitivity in the low illuminance region, so that even in a dark imaging environment or in an imaging environment having a dark portion, images can be obtained in a high sensitivity condition. In the standard illuminance region, the resolution can be enhanced and the dynamic range can be increased, so that sharp images can be obtained.

DESCRIPTION OF THE PREFERRED EMBODIMENTS

The imaging device and the exposure control method for the imaging device according to an embodiment the invention will be described with reference to FIGS. 1 to 8.

Figure 2:
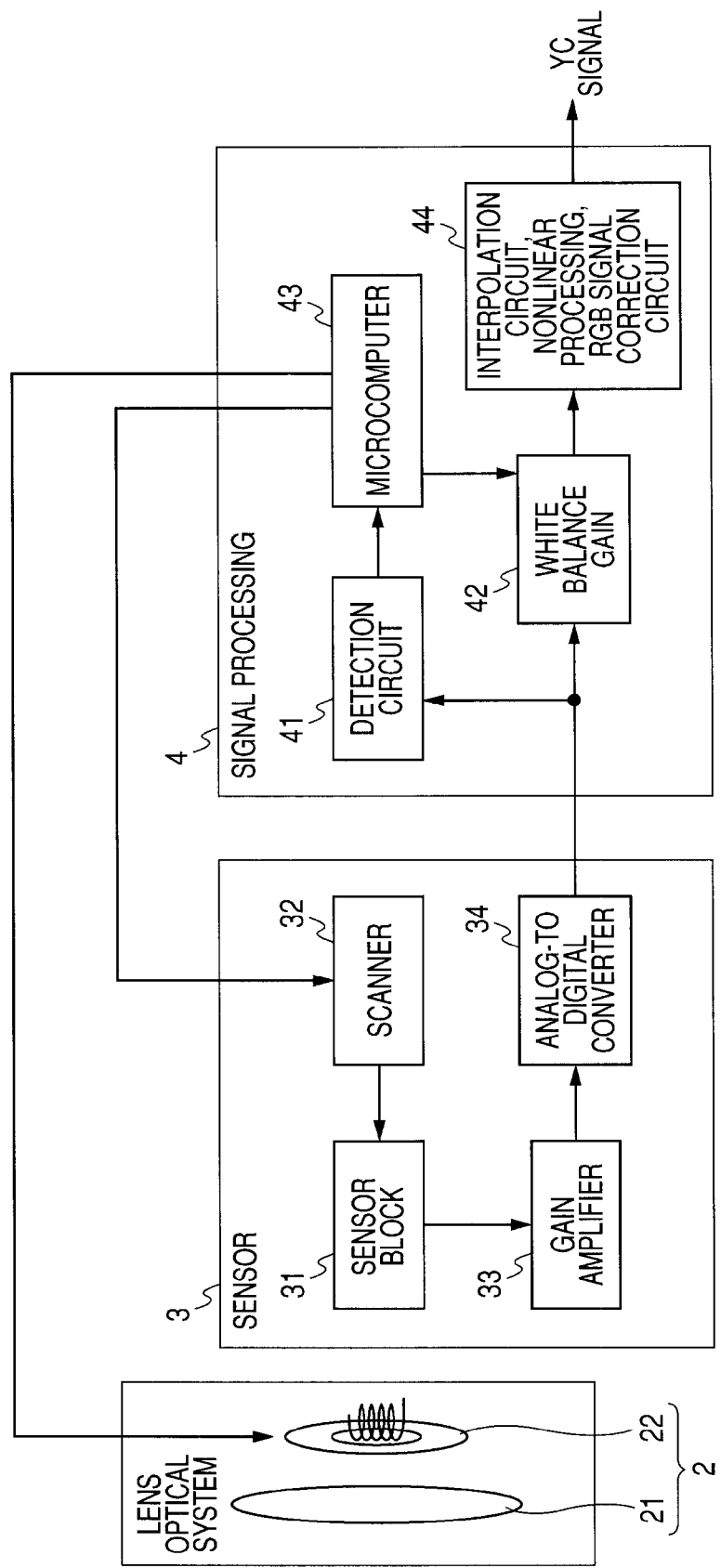
FIG. 2 is a block diagram showing the imaging device according to an embodiment of the invention.

Firstly, the imaging device will be described with reference to the block diagram of FIG. 2. As shown in FIG. 2, the imaging device 1 includes three blocks; a lens-based optical system 2, a sensor 3 and a signal processor 4. The imaging device 1 outputs a general-purpose YC signal (luminance signal/chrominance signal) as an output.

The lens-based optical system 2 includes a lens 21 and a stop 22. The stop 22 has a mechanism that opens and closes a vane stop, for example, by feeding current through a solenoid 23.

The sensor 3 primarily includes four blocks; a sensor block 31 that converts light into a charge signal, a scanner 32 that generates a clock signal for reading the charge from the sensor block 31, a gain amplifier 33 having a function of converting the charge into a voltage and amplifies the signal when the amount of charge is small, and an analog-to-digital (A/D) converter 34 that converts the signal voltage into digital data.

Figure 3:
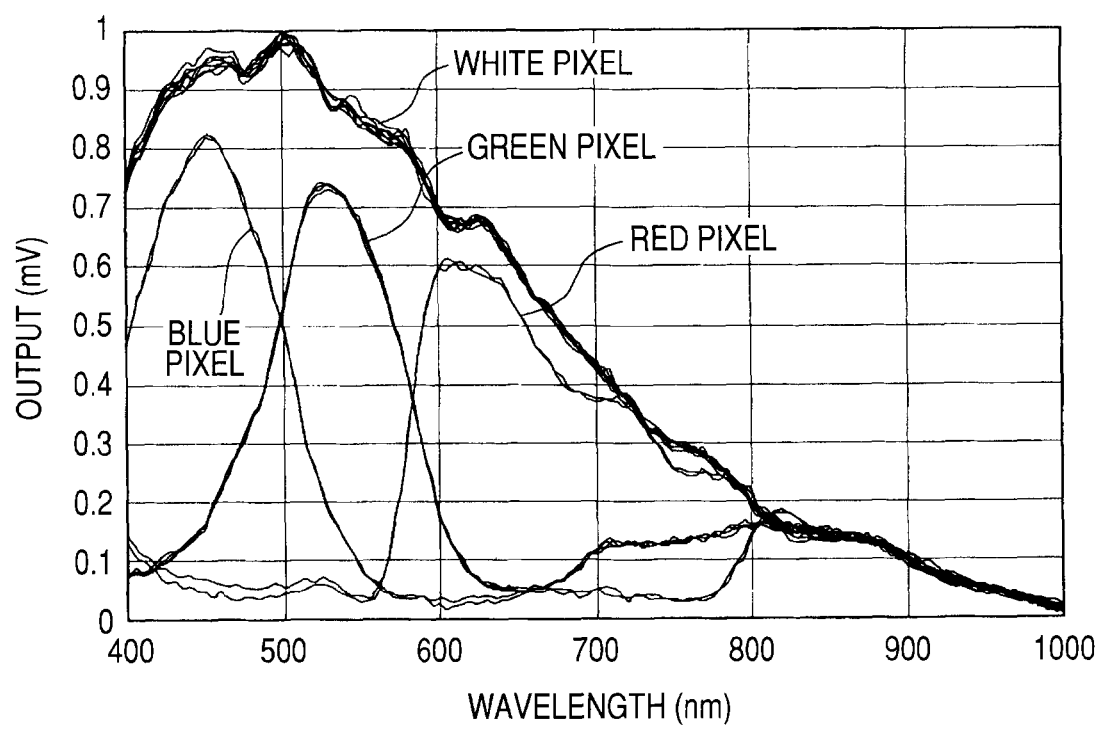
FIG. 3 shows a spectral characteristic of each pixel.
Figure 4:
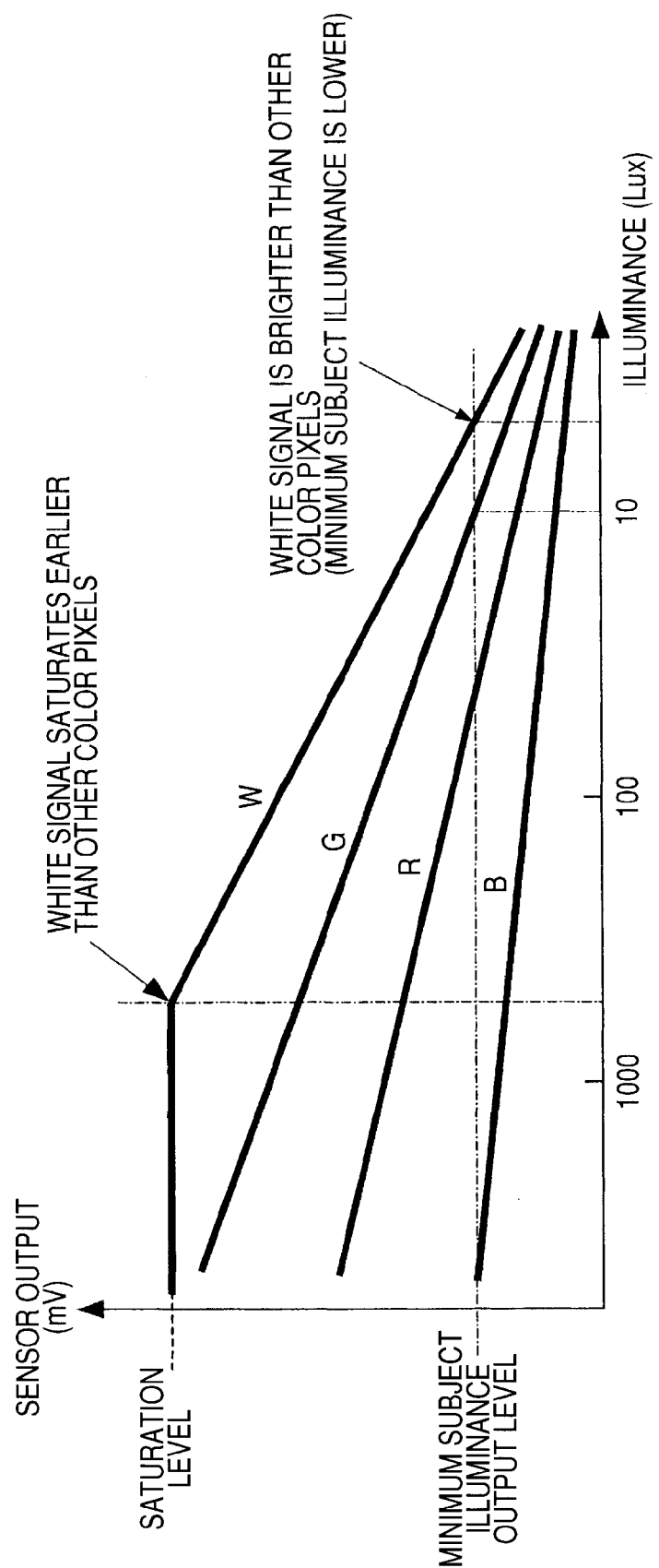
FIG. 4 shows the relationship between the sensor output and illuminance and shows the characteristic of white coding.
Figure 5:
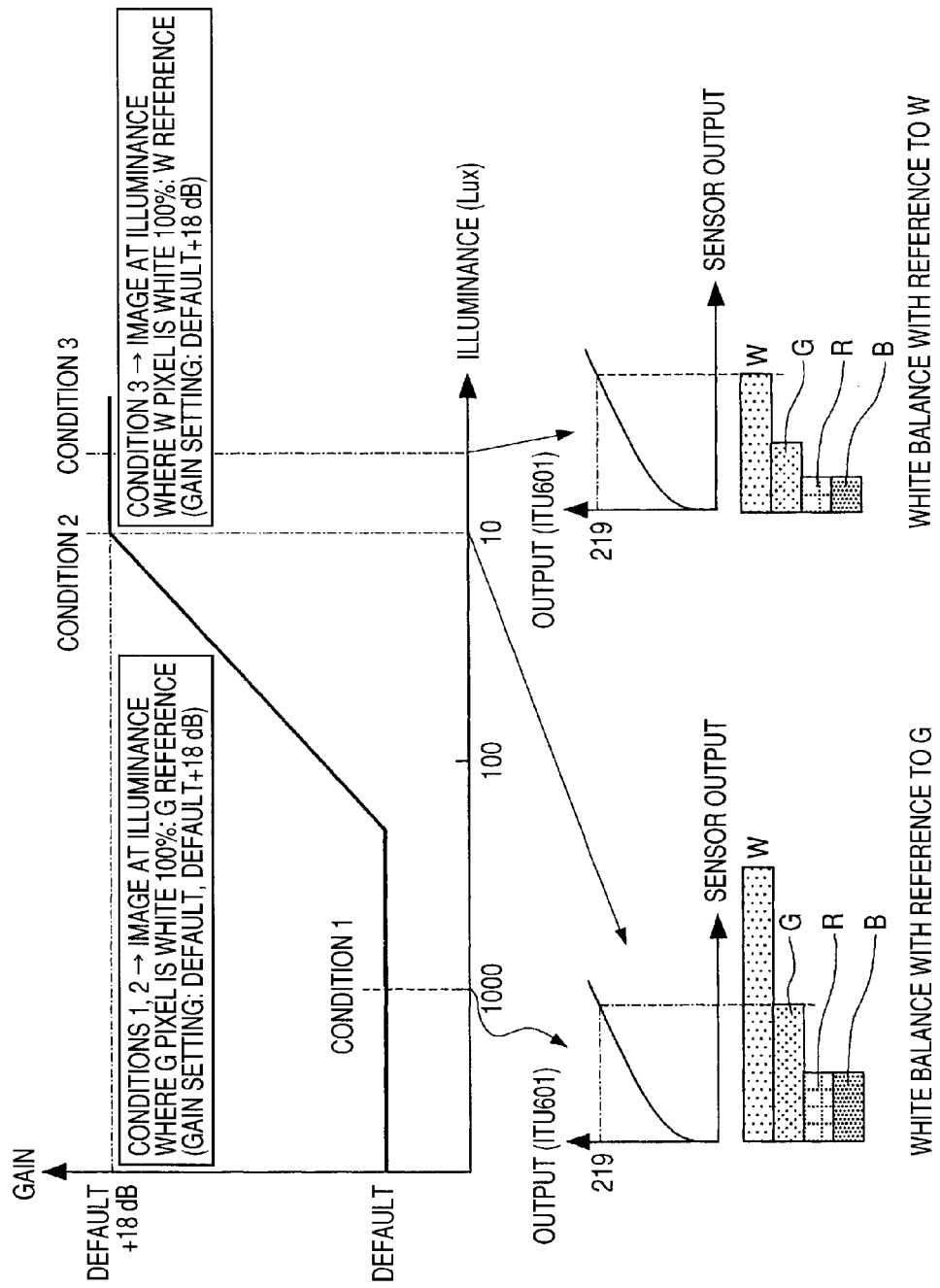
FIG. 5 shows an algorithm that determines the reference color in the level diagram.

The sensor block 31 is characterized in that as shown in FIG. 3 showing the relationship between the pixel output and wavelength and FIG. 4 showing the relationship between the pixel output and illuminance, high-sensitivity pixels, such as white pixels (W-pixels) or gray pixels (the figures show white pixels), have higher sensitivity to incident light, as compared to chromatic color pixels having color filters (such as R/G/B color filters), allowing improvement in sensitivity characteristic particularly in a low illuminance environment. The invention utilizes this characteristic.

The signal processor 4 primarily includes four blocks; a detection circuit 41 that integrates the digital data outputted from the analog-to-digital (A/D) converter 34, calculates the average of the entire signal and uses the calculation result as input information to control exposure, a white balance gain 42 that corrects variation in sensitivity of the white pixels and the RGB pixels in the sensor block 31 to control the gain of respective channels for correct color reproduction, a microcomputer 43 that uses the information from the detection circuit 41 as an input to calculate a value for controlling the stop 22, a value for controlling an electronic shutter of the scanner 32, a value for controlling the gain amplifier 33 and a value for controlling the white balance gain 42, and an interpolation circuit (interpolation)/nonlinear processing (γ-correction)/RGB signal correction circuit (color matrix RGB) 44.

The interpolation circuit/nonlinear processing/RGB signal correction circuit 44 includes a circuit that spatially interpolates three pieces of RGB information on respective color pixels, a nonlinear processor that corrects the input/output characteristic of a display, and a circuit that corrects variation in spectral characteristic of the sensor to correct the RGB signal for ideal color reproduction.

In video camcorders and the like, the lowest subject illuminance is defined as the illuminance in the darkest environment in which the camera can perform an imaging operation. For example, in the condition 3 shown in FIG. 5, white balance obtained with reference to white pixels allows the lowest subject illuminance to be set to a low value. That is, the gain for each of GRB pixels is increased to match the gain of white pixels. However, a disadvantage of using white pixels is that white pixels will be more easily saturated compared to other color pixels (RGB pixels, for example) in a bright environment, such as the condition 1 shown in FIG. 5. In such a case, white balance is obtained with reference to green (G) and the electronic shutter is operated to block the white pixels.

In the signal processor 4, the level diagram is determined with reference to the signal from the color pixel having the highest sensitivity in the color layout. Therefore, when white pixels are used, the level diagram is determined with reference to the white pixels. However, white pixels, which have higher sensitivity than the other color pixels, have a disadvantage of being easily saturated. Therefore, the imaging device according to this embodiment of the invention determines the level diagram with reference to the signal from high-sensitivity pixels (white pixels, for example) in a low illuminance region so as to effectively use the high sensitivity of white pixels. The imaging device according to this embodiment of the invention is also characterized in that in a standard illuminance region, the signal from green pixels, which are chromatic color pixels, is used as a reference to control exposure of only white pixels in such a way that the sensitivity is set to a low value, so as to improve the resolution and dynamic range. In the following description, white pixels are used as an example of the high-sensitivity pixel and R (red), G (green) and B (blue) pixels are used as an example of the chromatic color pixels. Alternatively, complementary colors of RGB can be used as chromatic color pixels.

An exemplary algorithm for determining the reference color in the level diagram in an adaptive manner, which is the main feature of the invention, will now be described with reference to FIG. 1.

Figure 1:
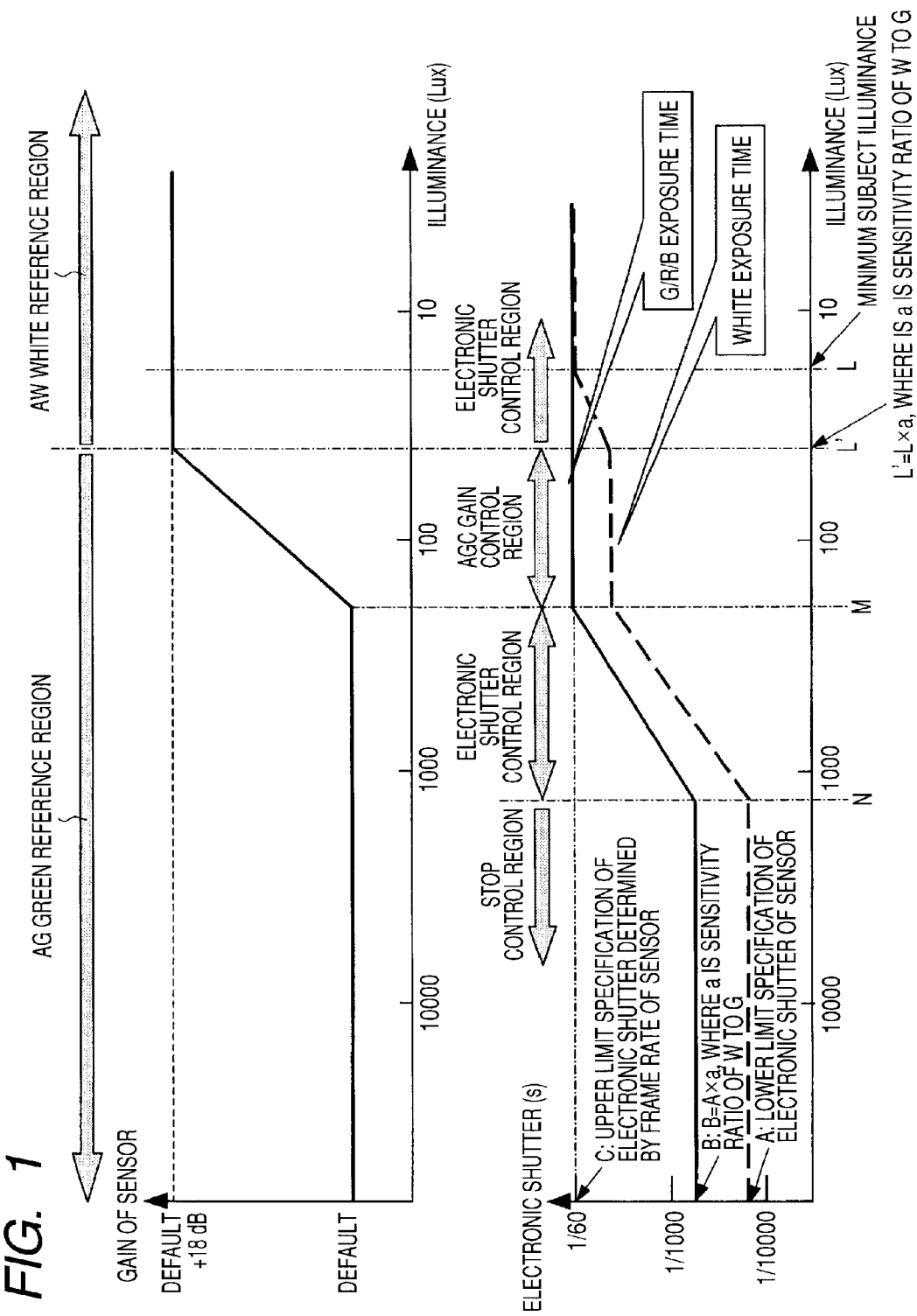
FIG. 1 shows an algorithm that determines a reference color in a level diagram, which is the main feature according to an embodiment of the invention.

As shown in FIG. 1, the imaging device 1 has an automatic exposure (AE) function that allows the imaging device 1 to control exposure according to the illuminance in the imaging environment. The illuminance can be measured by detecting the output signal from the sensor. A sensor using white can set, for example, four types of control regions.

The exposure control is classified into four types in descending order of illuminance; a stop control region, an RGB pixel electronic shutter control region, an AGC (Auto Gain Control) gain control region and a white pixel electronic shutter control region.

In the stop control region, the control operation is carried out by a stop that mechanically adjusts the amount of light. When the stop reaches the full-open end, the control is switched to the electronic shutter control region.

In the RGB pixel electronic shutter control region, an electronic shutter adjusts the amount of exposure. When the environment becomes darker and the exposure time of the electronic shutter is stuck to the upper limit, the control is switched to the AGC gain control region. Use of the electronic shutter to thus adjust the amount of exposure can block signals from the white pixels that reach the saturation level.

The AGC gain control region has a function of amplifying the sensor output signal in such a way that analog or digital gain control is used to keep the output signal from the imaging device at a fixed level.

In the stop control region, the RGB pixel electronic shutter control region and the AGC gain control region, the level diagram is set with reference to green, and the electronic shutter operation for white pixels is controlled independent of the other color pixels such that the white pixels will not be saturated.

When the illuminance in the imaging environment starts decreasing below the lowest subject illuminance for the green pixels, the amount of exposure for the white pixels is gradually increased in the white pixel electronic shutter control region. When the amount of exposure control for the white pixels finally becomes equal to the amount of exposure control for the green pixels, the lowest subject illuminance is reached. In this way, the sensitivity is improved in the low illuminance region.

The white pixel can be set to be the reference color in the process where the standard illuminance region is switched to the low illuminance region. Even only using the green pixels as the reference color in the standard illuminance region also provides advantages of enhancing the resolution and increasing the dynamic range in the standard illuminance region.

Next, a specific method for implementing the above algorithm will be described with reference to the flowchart of FIG. 6.

Figure 6:
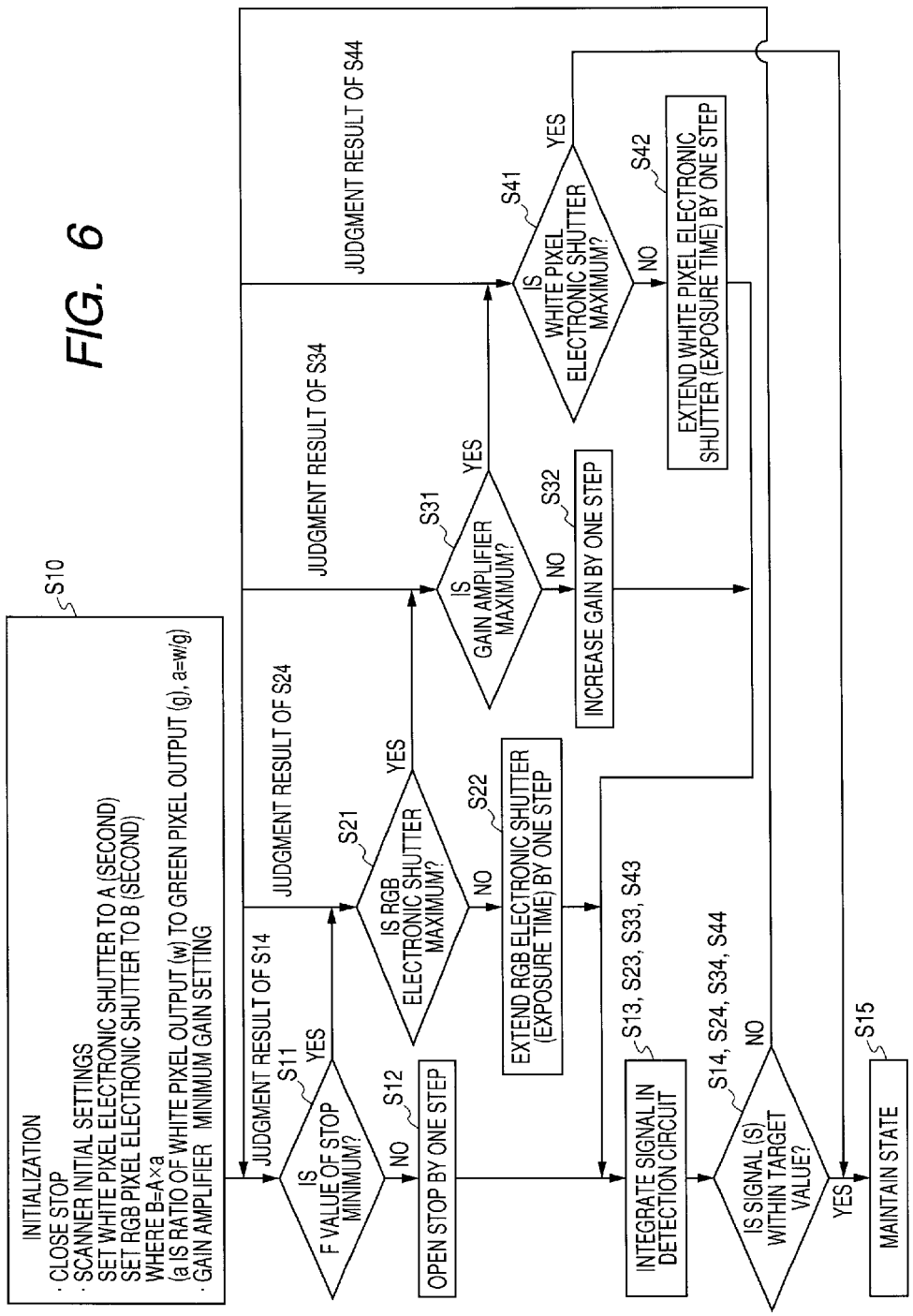
FIG. 6 is a flowchart showing the main feature according to an embodiment of the invention.

As shown in FIG. 6, the step S10 of "initialization settings" is first carried out. In the step S10 of "initialization settings", the stop is initialized to a closed state, so that light is blocked from reaching the sensor. The scanner is also initialized. The scanner has a function of controlling the electronic shutter that determines the shutter speed (or exposure time). The control of the electronic shutter for the white pixels is set independent of the control of the electronic shutters for the RGB pixels. Firstly, the white pixel electronic shutter is set to the shortest exposure time achievable from the viewpoint of circuit design. Let A (second) be the shortest exposure time. Then, the RGB pixel electronic shutter is set to have B (second) that satisfies the following equation.

$B = A \times a$ (second) (reference character $a$ is the ratio of the white pixel output ($w$) to the green pixel output ($g$), $a = w/g$)

By satisfying the above equation, it is possible to set an exposure condition in which the white pixels will not be saturated earlier than the other RGB pixels. The gain amplifier is set to the lowest gain achievable from the viewpoint of circuit design.

After the above initialization, automatic exposure (AE) is initiated.

Firstly, the step S11 of "Whether or not the F-number of the stop is a minimum" is carried out. When the result of the step S11 of "Whether or not the F-number of the stop is a minimum" is "No", the step S12 of "Open the stop by one step" is carried out. The step S12 of "Open the stop by one step" controls the stop and opens it by one step. After the stop opens by one step, the input signal is integrated in the step S13 of "Integrate the signal in the detection circuit." This operation increases the signal in the detection circuit. Then, the step S14 of "Whether or not the signal (S) is within a target value range" is carried out. In the step S14 of "Whether or not the signal (S) is within a target value range", it is judged whether the signal (S) has reached the target value (maximum (Max), minimum (Min)). When the signal (S) has reached the target value, that is, when the result is "Yes", the control is terminated at this point. Then, the control proceeds to the step S15 of "The state is maintained", meaning that the state when the control is terminated is maintained.

On the other hand, when the result of the step S14 of "Whether or not the signal (S) is within a target value range" is "No", that is, when the signal (S) has not reached the target value even in the state where the stop is fully open, the step S11 of "Whether or not the F-number of the stop is a minimum" is carried out again to judge whether or not the F-number of the stop is a minimum. When the result is "No", the stop is controlled again and the above steps are repeatedly carried out. The stop is thus controlled and opened by one step at a time.

When the result of the step S11 of "Whether or not the F-number of the stop is a minimum" is "Yes", that is, when the F-number of the stop is a minimum, the control proceeds to the next RGB pixel electronic shutter control region.

Then, in the step S21 of "Whether or not the RGB electronic shutter is set to a maximum", it is judged whether or not the RGB electronic shutter (exposure time) is set to a maximum. When the result is "No", the step S22 of "Extend the RGB electronic shutter (exposure time) by one step" is carried out. The step S22 of "Extend the RGB electronic shutter (exposure time) by one step" controls the RGB electronic shutter (exposure time) and extends it by one step. After the RGB electronic shutter (exposure time) is extended, in the step S23 of "Integrate the signal in the detection circuit", the input signal is integrated. The step S23 of "Integrate the signal in the detection circuit" and the step S13 of "Integrate the signal in the detection circuit" can be a common step.

That is, the integration of the input signal in the step S23 of "Integrate the signal in the detection circuit" increases the signal in the detection circuit. Then, the step S24 of "Whether or not the signal (S) is within a target value range" is carried out. In the step S24 of "Whether or not the signal (S) is within a target value range", it is judged whether the signal (S) has reached the target value (maximum (Max), minimum (Min)). When the signal (S) has reached the target value, that is, when the result is "Yes", the control is terminated at this point. Then, the control proceeds to the step S15 of "The state is maintained", meaning that the state when the control is terminated is maintained. The step S24 of "Whether or not the signal (S) is within a target value range" and the step S14 of "Judge whether or not the signal (S) is within a target value range" can be a common step.

On the other hand, when the result of the step S24 of "Whether or not the signal (S) is within a target value range" is "No", that is, when the signal (S) has not reached the target value even in the state where the exposure time of the RGB electronic shutter is set to a maximum, the step S21 of "Whether or not the RGB electronic shutter is set to a maximum" is carried out again to judge whether or not the RGB electronic shutter (exposure time) is set to a maximum, and the above steps are repeated.

On the other hand, when the result of the step S21 of "Whether or not the RGB electronic shutter is set to a maximum" is "Yes", the control proceeds to the AGC gain control region.

Then, in the step S31 of "Whether or not the gain amplifier is set to a maximum", it is judged whether or not the gain amplifier is set to a maximum. When the result is "No", the step S32 of "Increase the gain by one step" is carried out. The step S32 of "Extend the gain by one step" controls the gain amplifier to increase the gain by one step. After the gain is increased, in the step S33 of "Integrate the signal in the detection circuit", the input signal is integrated. The step S33 of "Integrate the signal in the detection circuit" and the step S13 of "Integrate the signal in the detection circuit" can be a common step.

That is, the integration of the input signal in the step S33 of "Integrate the signal in the detection circuit" increases the signal in the detection circuit. Then, the step S34 of "Whether or not the signal (S) is within a target value range" is carried out. In the step S34 of "Whether or not the signal (S) is within a target value range", it is judged whether the signal (S) has reached the target value (maximum (Max), minimum (Min)). When the signal (S) has reached the target value, that is, when the result is "Yes", the control is terminated at this point. Then, the control proceeds to the step S15 of "The state is maintained", meaning that the state when the control is terminated is maintained. The step S34 of "Whether or not the signal (S) is within a target value range" and the step S14 of "Whether or not the signal (S) is within a target value range" can be a common step.

On the other hand, the result of the step S34 of "Whether or not the signal (S) is within a target value range" is "No", that is, when the signal (S) has not reached the target value even in the state where the gain amplifier is set to a maximum, the step S31 of "Whether or not the gain amplifier is set to a maximum" is carried out again to judge whether or not the gain amplifier is set to a maximum, and the above steps are repeated.

On the other hand, when the result of the step S31 of "Whether or not the gain amplifier is set to a maximum" is "Yes", that is, when the gain is set to a maximum, the control will proceed to the next white pixel electronic shutter control region.

Then, in the step S41 of "Whether or not the white pixel electronic shutter is set to a maximum", it is judged whether or not the white pixel electronic shutter (exposure time) is set to a maximum. When the result is "No", the step S42 of "Extend the white pixel electronic shutter (exposure time) by one step" is carried out. The step S42 of "Extend the white pixel electronic shutter (exposure time) by one step" controls the white pixel electronic shutter (exposure time) and extends it by one step. After the white pixel electronic shutter (exposure time) is extended, in the step of S43 of "Integrate the signal in the detection circuit", the input signal is integrated. The step S43 of "Integrate the signal in the detection circuit" and the step S13 of "Integrate the signal in the detection circuit" can be a common step.

That is, the integration of the input signal in the step S43 of "Integrate the signal in the detection circuit" increases the signal in the detection circuit. Then, the step S44 of "Whether or not the signal (S) is within a target value range" is carried out. In the step S44 of "Whether or not the signal (S) is within a target value range", it is judged whether the signal (S) has reached the target value (maximum (Max), minimum (Min)). When the signal (S) has reached the target value, that is, when the result is "Yes", the control is terminated at this point. Then, the control proceeds to the step S15 of "The state is maintained", meaning that the state when the control is terminated is maintained. The step S44 of "Whether or not the signal (S) is within a target value range" and the step S14 of "Judge whether or not the signal (S) is within a target value range" can be a common step.

On the other hand, when the result of the step S44 of "Whether or not the signal (S) is within a target value range" is "No", that is, when the signal (S) has not reached the target value even in the state where the exposure time of the RGB electronic shutter is set to a maximum, the step S41 of "Whether or not the white pixel electronic shutter is set to a maximum" is carried out again to judge whether or not the RGB electronic shutter (exposure time) is set to a maximum, and the above steps are repeated.

The principle of controlling exposure only for the white pixels will now be described with reference to FIG. 7.

Figure 7:
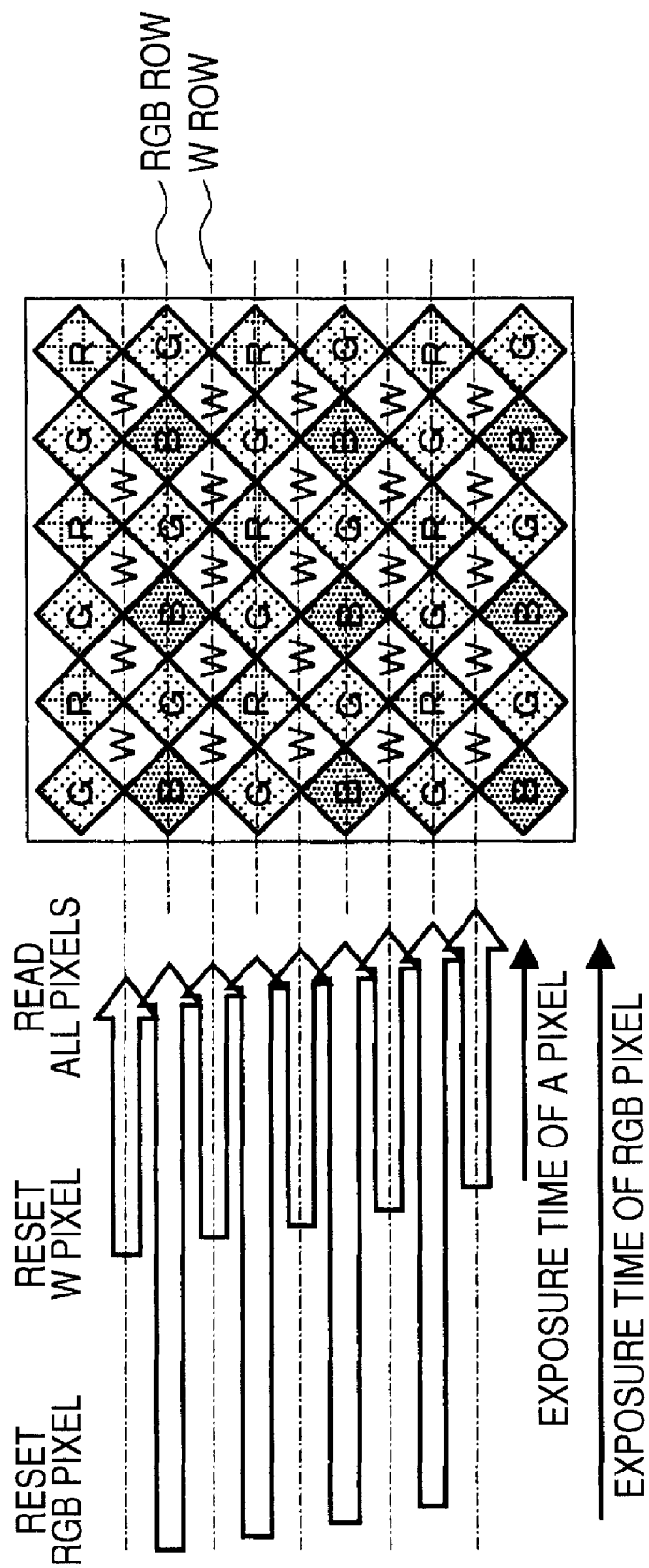
FIG. 7 explains the principle of controlling exposure only for white pixels.

As shown in FIG. 7, when the white pixels are arranged in a zigzag checkerboard pattern, rows including white pixels are only formed of white pixels. In this case, the exposure signal can be reset only for the white pixel rows independent of the other rows.

Next, a description will be made of white balance control when the exposure control is carried out as described with reference to FIG. 7.

Figure 8:
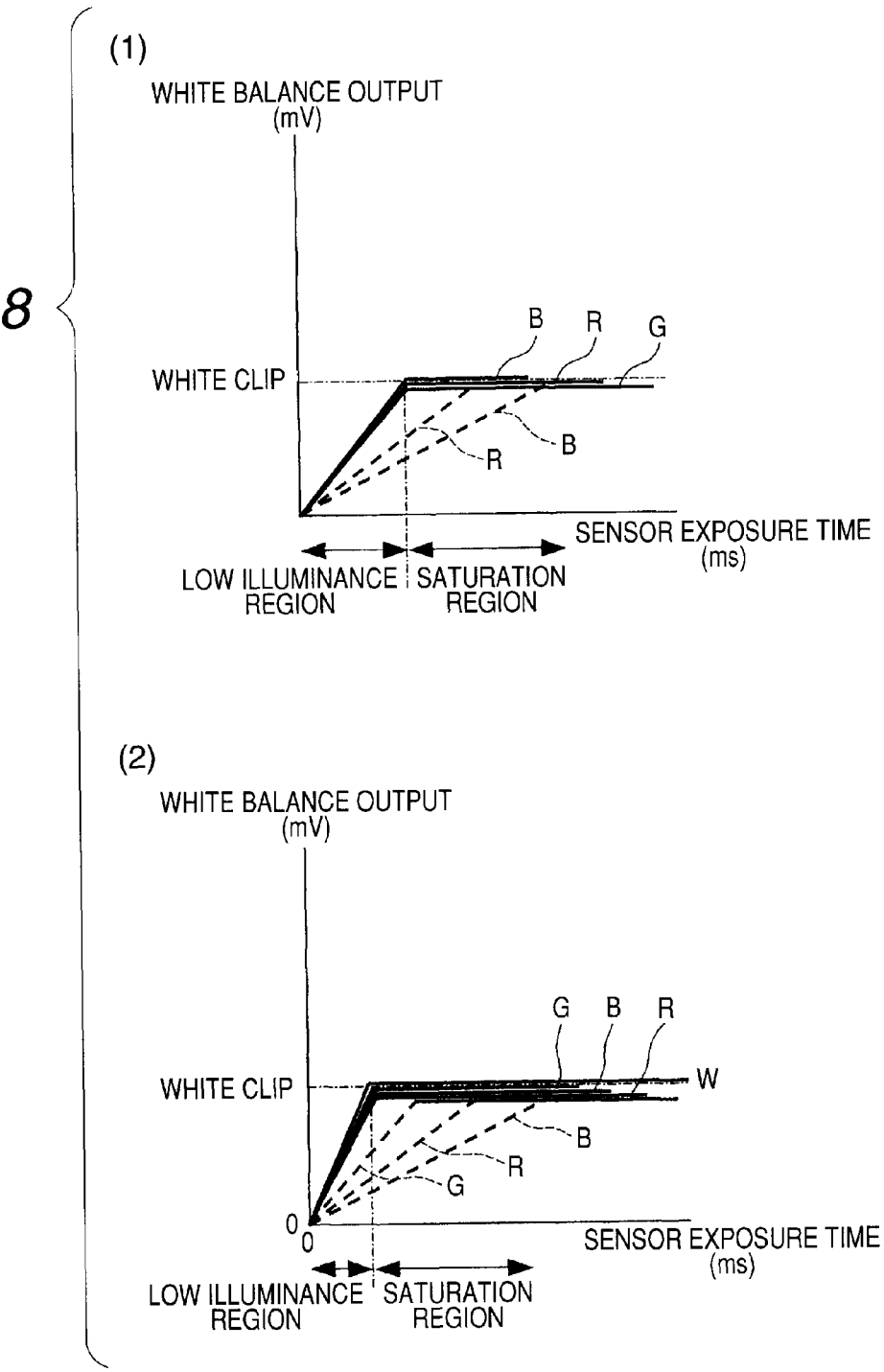
FIG. 8 explains the principle of white balance according to related art and an embodiment of the invention, respectively.

As shown in (1) in FIG. 8, when the signal processing does not use any white pixel, the largest output signal (G pixel signal level, for example) is typically used as a reference to carry out a white balance (amplification) operation in order to match the levels of the other color pixels (R and B pixels, for example) with the reference level. The result of the amplification is indicated by the solid lines. However, as shown in (2) in FIG. 8, when the color layout contains white pixels, the white pixels are used as a reference to adjust the levels of the other color pixels (R, G and B pixels indicated by the dotted lines, for example) to the reference level because the white pixels provide the largest output. The adjusted result is indicated by the solid lines. In the example of the principle of the white pixel-based white balance shown in FIG. 8, the exposure time for the white pixels is set to half the exposure time for the RGB pixels. In this way, even in a bright imaging environment, it is possible not only to carry out signal processing in such a way that white will not be saturated but also to maximize the sensitivity.

As described above, according to this embodiment, it is possible to increase the sensitivity, particularly the sensitivity in the low illuminance region. In this way, even in a dark imaging environment or in an imaging environment having a dark portion, images can be obtained in a high-sensitivity condition. In the standard illuminance region, the resolution can be enhanced and the dynamic range can be increased. Thus, sharp images can be obtained.

Although the above description has been made of the case where "white pixels" are used as an example of the high-sensitivity pixels, the high-sensitivity pixel is not limited to a (ideal) white or transparent pixel in the strict sense, but may be other pixels as far as their sensitivity is higher than that of conventional primary color pixels or complementary color pixels used to obtain color components for color reproduction. For example, the high-sensitivity pixel may be a pixel provided with a gray filter obtained by mixing a slight amount of component that blocks light with an ideal white or transparent state or a pixel provided with a filter obtained by mixing a slight amount of dye component with an ideal white or transparent state. However, from the viewpoint of carrying out signal processing, a filter in which color components of transmitted light are well balanced, such as a gray filter, is preferable compared to a filter in which a specific dye component is mixed in an unbalanced manner.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
    a sensor that is color coded by using high-sensitivity pixels having higher sensitivity to incident light than chromatic color pixels; and
    an automatic exposure configuration that allows the imaging device to control exposure according to illuminance in an imaging environment,
    wherein,
    the automatic exposure configuration is configured to control exposure of the sensor using a reference color relative to a level diagram according to control regions including at least a maximum exposure time of the high-sensitivity pixels, a maximum gain value and a maximum exposure time of the chromatic color pixels.

2. The imaging device according to claim 1, wherein the automatic exposure configuration includes an electronic shutter that is controlled such that only the high-sensitivity pixels undergo exposure control in a standard illuminance region having a higher illuminance than that of a low illuminance region.

3. The imaging device according to claim 1, wherein white balance adjustment is carried out in such a way that white balance is matched with the level of the high-sensitivity pixels in a low illuminance region.

4. The imaging device according to claim 1, wherein the high-sensitivity pixels are set to be the reference color in the process where a standard illuminance region is switched to a low illuminance region.

5. An imaging device comprising:
a sensor that is color coded by using high-sensitivity pixels having higher sensitivity to incident light than chromatic color pixels; and
an automatic exposure configuration that allows the imaging device to control exposure according to illuminance in an imaging environment,
wherein,
the automatic exposure configuration is configured to control exposure of the sensor using a reference color relative to a level diagram according to control regions including at least maximum exposure time of the high-sensitivity pixels, maximum gain value and maximum exposure time of the chromatic color pixels, using green pixels as the reference color in a standard illuminance region where the gain of the sensor is set to a minimum.

6. An exposure controlling method implemented in an imaging device which includes
(a) a sensor that is color coded by using high-sensitivity pixels having higher sensitivity to incident light than chromatic color pixels; and
(b) an automatic exposure configuration that allows the imaging device to control exposure according to illuminance in an imaging environment, the method comprising the steps of:
controlling exposure of the sensor using a reference color relative to a level diagram according to control regions including at least maximum exposure time of the high-sensitivity pixels, a maximum gain value and a maximum exposure time of the chromatic color pixels, and
using green pixels, which are the chromatic color pixels, as the reference color in a standard illuminance region where the gain of the sensor is set to a minimum.

7. An imaging device comprising:
an image sensor with chromatic color pixels and high-sensitivity pixels with a sensitivity to incident light higher than that of the chromatic color pixels; and
an exposure control configuration configured to control exposure of the chromatic color pixels and the high-sensitivity pixels over an illuminance range from relatively high illuminance to relatively low illuminance range conditions,
wherein,
in order of decreasing illuminance conditions, the exposure control configuration uses a mechanical shutter, a chromatic color pixel electronic shutter control, a gain amplifier and a high-sensitivity pixel electronic shutter, in that order, to control exposure.

8. The imaging device of claim 7, wherein the exposure control configuration selects which of the mechanical shutter, chromatic color pixel electronic shutter control, gain amplifier and high-sensitivity pixel electronic shutter to utilize based upon whether the currently selected of the mechanical shutter, chromatic color pixel electronic shutter control, gain amplifier and high-sensitivity pixel electronic shutter has reached its effective limit and whether an output signal is with a target range.

9. The imaging device of claim 7, wherein the gain amplifier is used to amplify the sensor output signal, and the exposure control configuration controls the gain of the gain amplifier.

10. The imaging device of claim 7, wherein the high-sensitivity pixels are white pixels.

* * * * *